Patented Mar. 28, 1939

2,151,883

UNITED STATES PATENT OFFICE

2,151,883

METHOD OF AND MEANS FOR EFFECTING ANIONIC EXCHANGES IN SOLUTIONS

Basil Albert Adams and Eric Leighton Holmes, Teddington, England

No Drawing. Application October 25, 1935, Serial No. 46,822. In Great Britain November 13, 1934

2 Claims. (Cl. 23—1)

This invention relates to the treatment of liquids to effect the removal therefrom of particular components or constituents by adsorption and in particular to effect the removal of certain anions and optionally the replacement thereof by other anions.

The invention is based upon the observation that resinous products obtained by the action of formaldehyde upon aromatic amines, possess properties which render them suitable for use in absorbing particular constituents or components from solutions and in particular in removing certain anions from solutions and generally the replacement of the removed anion by another anion.

In view of the very large number of products which fall within the scope of the present observation it will be understood that they present wide variations in respect of their capacity for utilization for the purposes indicated.

The invention extends, broadly, to the utilization of the properties of the products in question for industrial purposes and generally as a manner of manufacture.

The invention therefore consists in the process of treating liquids to effect the removal therefrom of particular components or constituents by adsorption or absorption, and in particular to effect the removal of certain anions and, optionally, the replacement thereof by other anions by the employment of the resin obtained by the reaction of formaldehyde on aromatic amines.

Insofar as the invention is concerned with the treatment of solutions for the purpose of removing certain anions the process, in accordance with the invention, may be combined or used in association or conjunction with the processes described in our co-pending application for Letters Patent No. 46,823, now Patent 2,104,501, issued January 4, 1938.

Thus, in accordance with the invention, a dilute solution containing, say, calcium, magnesium, chlorine and sulphate ions may be treated so that the final solution contains any chosen ions such as sodium and sulphate ions. This can be carried out by passage through a bed of a tannin resin containing the required cation, and through a bed of a resin obtained by the reaction of formaldehyde with an aromatic amine and containing the appropriate anion, it being immaterial which resin bed is used first.

As examples of aromatic amines there may be mentioned in particular aniline and more especially meta substituted aromatic amines, for example m-toluidine, m-ethylaminobenzene, sym-m-xylidine and m-phenylene-diamine and the like.

At this point it may be mentioned that generally or in certain cases the products derived from the corresponding ortho-substituted bodies are more readily soluble in acids.

Apparently in accordance with the invention the anion in the solution with which the insoluble resin-like products formed by the reaction of aldehydes with aromatic amines are treated, enters into weak combination with the said products, and by subsequent treatment with a solution containing another anion in appropriate concentration the anion taken up by the resin may be replaced by the anion present in such solution.

The following particulars are given of a mode of forming a product as defined above and of its applications:

93 grams of aniline were dissolved in rather more than one equivalent of hydrochloric acid in 1000 cc. of water and 1½ molecular proportions of formaldehyde as 40 per cent. solution were added. The mixture was stirred and allowed to stand at room temperature until it gelled, and the gel was then dried.

A dilute solution of calcium sulphate was allowed to percolate through 10 grams of the material at the rate of 200 cc. per hour. The filtrate gave no precipitate with barium chloride solution but contained calcium in the form of chloride.

The material was regenerated with dilute hydrochloric acid, the sulphate ion adsorbed being replaced by chlorine ion, the former appearing in the filtrate. Tap water similarly passed through a bed of aniline resin-hydrochloride was converted into a solution containing no sulphate ions.

If the original mass, which contains chlorine, is treated with alkalies such as N caustic soda or a solution of sodium carbonate a basic resin free from chlorine is obtained. This basic resin will absorb inorganic or organic acid and if treated with hydrochloric acid yields a material containing chlorine.

If the drying of the gel is carried out much above 100° the resin may have partly lost its capacity for acid adsorption. This property can be restored to the resin by an initial soaking in strong hydrochloric acid, followed by washing and alkali treatment, e. g., by normal caustic soda or sodium carbonate. The aniline resin which had been dried at 180° was found to remove little sulphuric acid from a N/100 aqueous solution, but after the above treatment it completely removed the acid from 21 litres of this solution.

As above indicated, generally the meta substituted aromatic amines, including m-phenylene diamine, yield products in the nature of resins which are insoluble in dilute acids, while the corresponding ortho-substituted bodies or certain of them yield products which are relatively soluble in mineral acids, and the same applies to certain of the products obtained by the condensation of aniline with formaldehyde as may be seen from the following:—

(a) o-Toluidine (50 g.), concentrated hydrochloric acid (50 g.), water (500 cc.) and 40 per cent. formalin (75 g.) react to yield a somewhat viscous, red liquid. The resin, precipitated when the hydrochloride acid is neutralized with an alkali, is, however, soluble in dilute mineral acid.

(b) The gel formed when aniline is condensed with two or more molecular proportions of formaldehyde, liquefies wholly or in part when heated at 100° C. Addition of alkali to this liquid precipitates a resin which, however, remains soluble in aqueous solutions of mineral acids.

The following are examples illustrating the adsorption of acids from aqueous solutions:

(a) Acid solutions (0.0035 M) were passed through 10 g. of each resin which had been treated with ammonia and washed free of excess base. The volumes from which the acid was completely removed are given in the table.

Table I

| Resin obtained from— | HCl | HNO$_3$ | H$_2$SO$_4$ |
|---|---|---|---|
| | | | Cc. |
| Aniline | 1100 | 1000 | 1200 |
| m-Toluidine | 2500 | 1500 | 2000 |
| sym-m-Xylidine | 1800 | 1800 | 2300 |
| m-Phenylene-diamine | 2600 | 1800 | 2300 |

(b) 0.0035 N solutions of sulphuric acid and of sodium sulphate were passed through the four beds of resin, which had previously been saturated with hydrochloric acid. The volumes of filtrate in which the SO$_4$ ion had been completely replaced by the Cl ion are given in Table II.

Table II

| Resin obtained from— | H$_2$SO$_4$ | Na$_2$SO$_4$ |
|---|---|---|
| Aniline | >600 | 1800 |
| m-Toluidine | >700 | 2200 |
| sym-m-Xylidine | >800 | 2100 |
| m-Phenylene-diamine | >900 | 1000 |

The double treatment of solutions is illustrated but not limited by the following examples:

(1) 18 litres of Teddington tap water of hardness 19 p.p. 100,000, after passing through 100 grams of quebracho tannin resin and then through 50 grams of m-phenylene diamine resin had a total solids content of less than 1 p.p. 100,000.

Treatment with 100 cc. of 5 per cent. hydrochloric acid solution and washing with 200 to 300 cc. of treated water was necessary to regenerate the tannin resin, while 70 cc. of 4 per cent. caustic soda and washing with 150 to 200 cc. of the original tap water regenerated the basic resin. The amount of treated water used for regeneration was less than 3 per cent. of the total amount treated.

(2) A natural water containing 260 p.p. 100,000 of solids, mostly sodium chloride, was treated as in Example 1 and about 2 litres were purefied by the same quantities of resins. It required about the same volume of treated water for regeneration as in Example 1.

As will be seen from these examples the net balance of treated water increases with the dilution of the untreated water, but generally speaking this depends on the pH of the untreated water. A high pH value tends to increase the adsorption properties of the tannin resins.

What we claim is:

1. The process of treating liquids to effect the removal therefrom of the anion of a compound in solution therein, which comprises treating the liquid with an insoluble resin-like product obtained by the reaction of formaldehyde with an aromatic amine.

2. The process of treating liquids to effect replacement of an anion of a compound in solution therein by another anion, which comprises treating the liquid with an insoluble resin-like product obtained by the reaction of formaldehyde with an aromatic amine, said resin having been previously treated with a solution containing a compound of the anion to be introduced.

BASIL ALBERT ADAMS.
ERIC LEIGHTON HOLMES.